(12) United States Patent
Binnig et al.

(10) Patent No.: US 11,091,862 B2
(45) Date of Patent: Aug. 17, 2021

(54) FORMED-FABRIC-STRENGTHENING DEVICE FOR STRENGTHENING FORMED FABRIC AND CONTROL DEVICE AND PROCESS FOR OPERATING DRIVE DEVICES OF THE FORMED-FABRIC-STRENGTHENING DEVICE

(71) Applicant: AUTEFA SOLUTIONS GERMANY GMBH, Friedberg (DE)

(72) Inventors: Joachim Binnig, Jettingen-Scheppach (DE); Christian Richter, Augsburg (DE)

(73) Assignee: AUTEFA SOLUTIONS GERMANY GMBH, Friedberg (DE)

( * ) Notice: Subject to any disclaimer, the term of this patent is extended or adjusted under 35 U.S.C. 154(b) by 442 days.

(21) Appl. No.: 15/775,165

(22) PCT Filed: Nov. 11, 2016

(86) PCT No.: PCT/EP2016/077417
§ 371 (c)(1),
(2) Date: May 10, 2018

(87) PCT Pub. No.: WO2017/081241
PCT Pub. Date: May 18, 2017

(65) Prior Publication Data
US 2018/0371658 A1    Dec. 27, 2018

(30) Foreign Application Priority Data

Nov. 11, 2015  (DE) ...................... 10 2015 119 470.8

(51) Int. Cl.
*D04H 18/02*   (2012.01)
*G05D 19/02*   (2006.01)
*G05B 19/04*   (2006.01)

(52) U.S. Cl.
CPC ............ *D04H 18/02* (2013.01); *G05B 19/04* (2013.01); *G05D 19/02* (2013.01)

(58) Field of Classification Search
CPC ........ D04H 18/00; D04H 18/02; G05D 19/02; G05B 19/04
(Continued)

(56) References Cited

U.S. PATENT DOCUMENTS 4,267,496 A * 5/1981 Ivanov ................... G05D 19/02
                                                          318/615
4,395,904 A * 8/1983 Ivanov ................... G05D 19/02
                                                          318/617
(Continued)

FOREIGN PATENT DOCUMENTS

CN        1896360 A    1/2007
CN      101003927 A    7/2007
(Continued)

*Primary Examiner* — Anne M Kozak
(74) *Attorney, Agent, or Firm* — McGlew and Tuttle, P.C.

(57) ABSTRACT

A fibrous-web-consolidating appliance which is configured to consolidate fibrous web and includes: at least two drive devices, each of which is configured to drive at least one needling device of the fibrous-web-consolidating appliance. Each needling device is configured to consolidate fibrous web and is driven by one of the at least two drive devices. At least one oscillation-recording device is configured to record oscillation data, the oscillations including oscillations such as those created by the operation of the needling devices. A control device is configured to receive the oscillation data recorded by the oscillation-recording device and to control the operation of the at least two drive devices in response to the received oscillation data. A control device and a method for operating the drive devices of the fibrous-web-consolidating appliance are also provided.

20 Claims, 7 Drawing Sheets

(58) Field of Classification Search
USPC .......................................................... 28/111
See application file for complete search history.

(56) References Cited

U.S. PATENT DOCUMENTS

| | | | |
|---|---|---|---|
| 5,636,420 A | | 6/1997 | Jourde et al. |
| 5,732,453 A | * | 3/1998 | Dilo ........................ D04H 18/02 28/107 |
| 5,909,883 A | * | 6/1999 | Jourde ..................... D04H 18/02 28/114 |
| 7,373,705 B2 | | 5/2008 | Jean et al. |
| 2006/0288548 A1 | * | 12/2006 | Jean ........................ D04H 18/02 28/107 |
| 2006/0288549 A1 | * | 12/2006 | Jean ........................ D04H 18/02 28/107 |
| 2007/0006432 A1 | * | 1/2007 | Noel ....................... D04H 18/02 28/107 |
| 2014/0310928 A1 | * | 10/2014 | Kuhl ........................ D04H 1/46 28/110 |
| 2016/0225365 A1 | * | 8/2016 | Dooley ................. G10K 11/178 |
| 2018/0355528 A1 | * | 12/2018 | Leger ...................... D04H 18/02 |

FOREIGN PATENT DOCUMENTS

| | | |
|---|---|---|
| CN | 101937198 A | 1/2011 |
| CN | 101078152 A | 11/2017 |
| DE | 693 04 208 T2 | 1/1997 |
| EP | 1 736 586 A1 | 12/2006 |
| EP | 1 811 072 A1 | 7/2007 |
| EP | 1 860 221 A2 | 11/2007 |
| EP | 2 119 818 A1 | 11/2009 |

\* cited by examiner

US 11,091,862 B2

FORMED-FABRIC-STRENGTHENING DEVICE FOR STRENGTHENING FORMED FABRIC AND CONTROL DEVICE AND PROCESS FOR OPERATING DRIVE DEVICES OF THE FORMED-FABRIC-STRENGTHENING DEVICE

CROSS REFERENCE TO RELATED APPLICATIONS

This application is a United States National Phase Application of International Application PCT/EP2016/077417, filed Nov. 11, 2016, and claims the benefit of priority under 35 U.S.C. § 119 of German Application 10 2015 119 470.8, filed Nov. 11, 2015, the entire contents of which are incorporated herein by reference.

FIELD OF THE INVENTION

The present invention pertains to a formed-fabric-strengthening device, which is configured to strengthen formed fabric; a control device, which is configured to operate at least two drive devices of the formed-fabric-strengthening device, and a process for operating the at least two drive devices of the formed-fabric-strengthening device.

BACKGROUND OF THE INVENTION

The use of formed-fabric-strengthening devices to strengthen formed fabric is generally known. A plurality of needles are inserted into a yet unstrengthened fiber composite (formed fabric) in a formed-fabric-strengthening device. The needles may have a density of, for example, up to 20,000 per m of working width. The needles have barbs, with which interlacing of the fibers in the formed fabric is brought about when the needles are being inserted into the formed fabric. The needles are inserted at a high frequency, which may be as high as, for example, about 60 Hz. An increase in the density of the material is achieved and strengthening of the material is thus also brought about by the interlacing of the fibers. For example, more than 1,000 insertions/cm2 can be made into the formed fabric in a system comprising a plurality of series-connected formed-fabric-strengthening devices.

A formed-fabric-strengthening device comprises needling devices, which have boards with needles. The needling devices are moved during the operation of the formed-fabric-strengthening device such that the boards strike a running formed fabric with their side fitted with needles. As a result, the needles are inserted into the formed fabric and they strengthen same. Two or more needling devices are often used in a formed-fabric-strengthening device. The formed fabric can be needled in this case in a formed-fabric-strengthening device from the bottom and from the top at the same time. The needle boards are moved, e.g., by means of a crank gear.

Oscillation excitations (hereinafter also called excitations) occur in the formed-fabric-strengthening device due to the motions. They occur, on the one hand, due to the crank gear and, on the other hand, due to the insertion of the needles into the formed fabric.

The oscillation excitation, which occurs due to the crank gear, is a first-order and second-order excitation. The first-order excitation generated by the crank gear can often be eliminated by balancing.

The insertion of the needles into the formed fabric brings about the generation of needle insertion forces, which additionally lead to a further oscillation excitation. This excitation may be in the range of the fourth order through the seventh order depending on the fiber material, the weight per unit area and the needle density and cannot be avoided.

Both oscillation excitations cause the frame of the formed-fabric-strengthening device, on which the needling devices are arranged, to oscillate. Excessively high oscillations, which occur especially in case of resonance, may lead to damage to the formed-fabric-strengthening device.

To avoid potential damage, the frame of a formed-fabric-strengthening device, on which the needling devices are arranged, is configured, as a rule, as a very rigid frame. The resonance frequency or natural frequency (i.e., the frequency at which the frame can oscillate after a single-time excitation as a natural form) is usually above the second-order excitation, which occurs due to the crank gear. The natural frequency may be, for example, in the range of about 80 Hz to 85 Hz. A corresponding configuration of the frame concerning higher-order excitations, which occur due to the insertion forces, is possible, however, with difficulty only.

If, for example, formed-fabric-strengthening devices with four needle boards are used, two of the four boards to and from the formed fabric from one side (e.g., from the upper side) of the running formed fabric and the others of the two boards are moved from the opposite side (e.g., the lower side) of the running formed fabric. The insertions may take place, for example, alternatingly from both sides. An excitation that may be in the range of the second order, fourth order and sixth order due to superimposition may occur in this case. An excitation in the range of the fourth order is already often considered to be critical.

If the excitation intensifies, it may lead to damage to the formed-fabric-strengthening device. This is often avoided by blocking certain speed ranges. The optimal speed range of a formed-fabric-strengthening device may, however, depend on many factors, e.g., on physical and/or optical properties of the product and the specification of machines arranged upstream and/or downstream. This does, however, lead to great limitations for the user. Shifting the resonance frequency or natural frequency of the frame into a higher frequency range (e.g., markedly above 100 Hz) by means of a correspondingly suitable construction of the frame entails considerable costs and can hardly be achieved at all in the prior-art formed-fabric-strengthening devices.

The installation of additional complicated oscillation dampers is known from EP 2 119 818 A1 and EP 1 860 221 A2.

Thus, there is a need for formed-fabric-strengthening devices that handle oscillations of different orders during the operation without the need for making complicated settings in the formed-fabric-strengthening devices.

SUMMARY OF THE INVENTION

Thus, an object of the present invention is to provide a formed-fabric-strengthening device and a control for operating a formed-fabric-strengthening device, which are independent from excitations that occur during the operation of the formed-fabric-strengthening device.

The present invention comprises a formed-fabric-strengthening device, which is configured to strengthen formed fabric and has at least two drive devices, each of which is configured to drive at least needling device of the formed-fabric-strengthening device, wherein each needling device is configured to strengthen formed fabric and is driven by one of the at least two drive devices; at least one oscillation detection device, which is configured to detect data, wherein the oscillations comprise oscillations that occur due to the operation of the needling devices; and a control device, which is configured to receive oscillation data, which are detected by the oscillation detection device and to control the operation of the at least two drive devices in response to the reception of the oscillation data.

The drive devices may have a drive train of their own each and a drive of their own. It is further possible for a plurality of drive devices to have a common drive and a drive train of their own each. The operation of the at least two drive devices may be controlled by the control of said own drives or of at least one own drive train. The latter is possible due to a setting device in the area of at least one own drive train. The setting device may be formed, e.g., by a shaft coupling controllable preferably during the operation, by a controllable transmission, especially shift transmission, or the like.

The oscillation may be detected in different ways, especially directly or indirectly. In case of a direct detection, the oscillations can be determined by measurement during the ongoing production operation of the formed-fabric-strengthening device and used to control the operation of the at least two drive devices. In case of an indirect detection, the oscillations can be detected in advance by measurement at the time of the set-up of a formed-fabric-strengthening device together with the corresponding insertion or stroke frequencies of the needling devices. An assignment of said stroke frequencies to the oscillations occurring in the process can be formed from this, e.g., in the form of a characteristic diagram. This device-specific assignment may be stored. The stroke frequencies of the needling devices can be detected by measurement during the production operation of the formed-fabric-strengthening device and the corresponding oscillations can be detected indirectly by polling the assignment or the characteristic diagram and then used to control the operation of the at least two drive devices. These possibilities of oscillation detection may be used alone or in any desired combination. It is further possible to detect a resonance frequency by calculation.

Due to the formed-fabric-strengthening device taking the oscillations into consideration, which are generated by the operation of the needling devices, during the driving of the needling devices, the formed-fabric-strengthening device is able to respond to critical situations in a purposeful manner, rapidly and flexibly. Critical oscillation excitations may occur, as was described above, especially due to the insertion of the needles into the formed fabric and may reach fourth-order through seventh-order excitations, which the frame of the formed-fabric-strengthening device cannot handle. A control of a formed-fabric-strengthening device, which is independent from excitations that occur during the operation of the formed-fabric-strengthening device, is provided especially by the control device. Moreover, an intelligent and independent operation of the formed-fabric-strengthening device is provided, with which operation potential damage to the formed-fabric-strengthening device is averted by the machine itself.

According to one embodiment of the present invention, the control device is configured to control the operation of the at least two drive devices by transmitting control information to the drive devices, wherein the control information has information on a phase shift between two of the at least two drive devices, with which the two drive devices are to be operated; and the phase shift is a phase shift that was determined in response to the reception of the oscillation data.

The phase shift of the drive devices may occur between the drives or drive trains thereof and can be set. By setting a phase shift between two drive devices in response to oscillations that were detected in the formed-fabric-strengthening device, a purposeful and possibly quick response to oscillations in the device that may have negative damaging effects on the formed-fabric-strengthening device is guaranteed. If the two drive devices are already operating with a phase shift or if a current phase shift is already given, the phase shift that is set corresponds to a new or changed phase shift. The working characteristic of the drive devices is changed with the (new or changed) phase shift. This changes the oscillations occurring in the device. If oscillations that may damage the device are detected, a phase shift, which prevents the further operation with these oscillations, is determined.

According to one embodiment of the present invention, the control device is configured to detect an input, which has data on the phase shift; or to determine the phase shift. The control may thus be configured in two different ways: By expert check or in an automated manner. In the first case, the person skilled in the art will examine the data on the detected oscillations and cause the control device by a corresponding input to carry out the control with a phase shift checked by the person skilled the art. In the second case, the control device determines the phase shift independently, i.e., without the checking by the person skilled in the art and it then performs a corresponding control.

According to one embodiment, the oscillation data indicate at least the following: An excitation frequency, which occurs due to the driving of the needling devices, and a resonance frequency of the formed-fabric-strengthening device and/or an oscillation amplitude, which occurs due to the driving of the needling devices, and a limit value for the oscillation amplitude, which is in the range of the resonance frequency of the formed-fabric-strengthening device.

The excitation frequency is the response frequency of the formed-fabric-strengthening device occurring due to the drive excitation. Here, it may be an individual frequency or a plurality of frequencies or a frequency spectrum. Corresponding statements apply to the resonance frequency.

According to one embodiment, the control device is configured to determine the phase shift such that said excitation frequency, which occurs due to the driving of the needling devices, and the resonance frequency of the formed-fabric-strengthening device do not coincide and/or that the oscillation amplitude, which occurs due to the driving of the needling devices, does not exceed the amplitude limit value in the range of the resonance frequency. This averts damage to the formed-fabric-strengthening device, which may occur due to excessive oscillation amplitudes in case of the coincidence of the excitation frequency and the resonance frequency or in case the limit value is exceeded.

According to one embodiment of the present invention, the control device is configured to determine the phase shift when the oscillation data indicate that the excitation frequency and the resonance frequency come close to one another and/or that the oscillation amplitude, which occurs due to the driving of the needling devices, comes close to the amplitude limit value in the range of the resonance frequency. This may take place when it is determined that oscillation amplitude comes very close to the amplitude limit value. The phase shift is thus changed in a controlled manner.

According to one embodiment of the present invention, the control device is configured to send a warning signal when the oscillation data indicate that the excitation frequency and the resonance frequency are coming very close to one another and/or that the oscillation amplitude, which occurs due to the driving of the needling devices, is coming unacceptably close to the amplitude limit value in the range of the resonance frequency. The control is thus increased in situations in which the oscillations of the frame begin to come close to the critical oscillations, which can lead to or are very likely to lead to damage to the device.

There are various possibilities for configuring the oscillation detection device, especially for said direct and indirect oscillation detection.

According to one embodiment of the present invention, at least one of the at least one oscillation detection device is configured such that it comprises an oscillation sensor, e.g., an acceleration sensor, or is an oscillation sensor or acceleration sensor. This is advantageous for a direct oscillation detection and in the production operation. An oscillation sensor or acceleration sensor or the signal analysis thereof reliably determines whether a velocity and hence an increase or decrease in oscillation takes place. The reliability of averting damage to the formed-fabric-strengthening device according to the present invention is thus increased.

According to another alternative or additional embodiment of the present invention, the oscillation detection device has a sensor for the stroke frequency of the needling devices and a stored, device-specific assignment, especially a characteristic diagram, of the stroke frequencies to the oscillations occurring in the process. The latter can be detected in the aforementioned manner by an oscillation sensor. Said stroke frequency may be detected by means of sensors in various manners, e.g., directly at the needling device or needling devices or indirectly via the drive speed. The assignment or the characteristic diagram may be stored at any desired location and kept ready for polling by the control device, e.g., in an integrated memory or in a technology data bank of the control device. The assignment or the characteristic diagram may be generated at the time of the aforementioned set-up of a formed-fabric-strengthening device, the detection of the stroke frequency and the polling of the assignment/characteristic diagram taking place during the production operation. The oscillation sensor, which is used as a single sensor or as a plurality of sensors, may be used temporarily and then removed from the formed-fabric-strengthening device. The temporary use may be carried out, e.g., during the set-up or changeover of the formed-fabric-strengthening device. The set-up or changeover may be carried out with the use of different formed fabrics or formed fabric webs.

According to one embodiment, the formed-fabric-strengthening device has a frame. According to another embodiment, the at least one oscillation detection device is arranged on the frame. The at least one oscillation detection device thus measures the oscillations on the frame. The frame is the location at which the oscillations occurring come together, and, moreover, it is the part of the device at which damage due to the occurrence of excessively high oscillations is most probable. The detection of the oscillations on the frame thus increases the effectiveness and the reliability of averting damage according to the present invention to the formed-fabric-strengthening device. This applies to said direct and indirect oscillation detection.

According to one embodiment, the resonance frequency is a frequency detected on the frame.

According to one embodiment, the formed-fabric-strengthening device has at least two oscillation detection devices, especially with oscillation sensor(s), which are arranged on two different sides of the formed-fabric-strengthening device. The diversity in the propagation of the oscillations is thus taken into consideration. Further, a plurality of critical points are monitored in this manner on the frame of the formed-fabric-strengthening device, which increases the guarantee that damage to the formed-fabric-strengthening device is averted.

According to another embodiment, one of the at least two oscillation detection devices, especially with oscillation sensor(s), is arranged above the needling devices, and at least one other of the at least two oscillation detection devices is arranged under the needling devices. It is ensured in this manner that precisely the oscillations that occur due to the operation of the needling devices and that are especially damaging for the formed-fabric-strengthening device are monitored.

According to one embodiment, at least one of the at least two oscillation detection devices, especially with oscillation sensor(s), is arranged on the upper side of the frame, and at least one additional of the at least two oscillation detection devices is arranged on the lower side of the frame. Since damage that occurs due to excessively high oscillations does so especially on the frame of the formed-fabric-strengthening device, the monitoring of the damaging oscillations and the guarantee that damage to the formed-fabric-strengthening device is averted are thus increased.

According to one embodiment, the needling devices have at least one upper needling device and at least one lower needling device, the upper needling device being arranged on the upper side of the frame and the at least one lower needling device being arranged on the lower side of the frame, with each of the needling devices having at least one board with needles for strengthening formed fabric. The at least two drive devices have at least one upper drive device and at least one lower drive device, each of the upper drive devices being configured to drive one of the upper needling devices, and each of the lower needling devices being configured to drive one of the lower needling devices.

According to one embodiment, the formed-fabric-strengthening device has a conveying device for conveying the web-like formed fabric through the needling devices. The formed-fabric-strengthening device may further have a formed fabric guide at the needling devices. This formed fabric guide may have a stationary upper and lower plate with passage openings for needles, the plates holding the formed fabric during the insertion and during the retraction of the needle.

The present invention further pertains to a control device, which is configured to receive oscillation data, which were detected by an oscillation detection device of a formed-fabric-strengthening device, wherein the oscillations comprise oscillations that occur due to the operation of needling devices of the formed-fabric-strengthening device; and to control the operation of at least two drive devices of the formed-fabric-strengthening device in response to the reception of the oscillation data, wherein each of the drive devices is configured to drive at least one needling device of the formed-fabric-strengthening device, and each needling device is configured to strengthen formed fabric and is driven by one of the at least two drive devices.

The present invention pertains, moreover, to a process for controlling the operation of at least two drive devices of a formed-fabric-strengthening device, wherein the formed-fabric-strengthening device is configured to strengthen formed fabric and each of the drive devices of the formed-fabric-strengthening device drives at least one needling device of the formed-fabric-strengthening device, which is configured to strengthen formed fabric and is driven by one of the at least two drive devices, the process comprising: The reception of oscillation data, which were detected by an oscillation detection device of a formed-fabric-strengthening device, wherein the oscillations comprise oscillations that occur due to the operation of the needling devices of the formed-fabric-strengthening device; and a control of the operation of the at least two drive devices of the formed-fabric-strengthening device in response to the reception of the oscillation data. The process is configured as a whole such that it has all or at least some of the steps being described here.

The advantages described as examples in this description are also achieved by the control device according to the present invention and by the process according to the present invention. It should be noted that the present invention is not limited to the advantages being described here and it also leads or can lead to additional advantages, which are not explicitly mentioned here.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
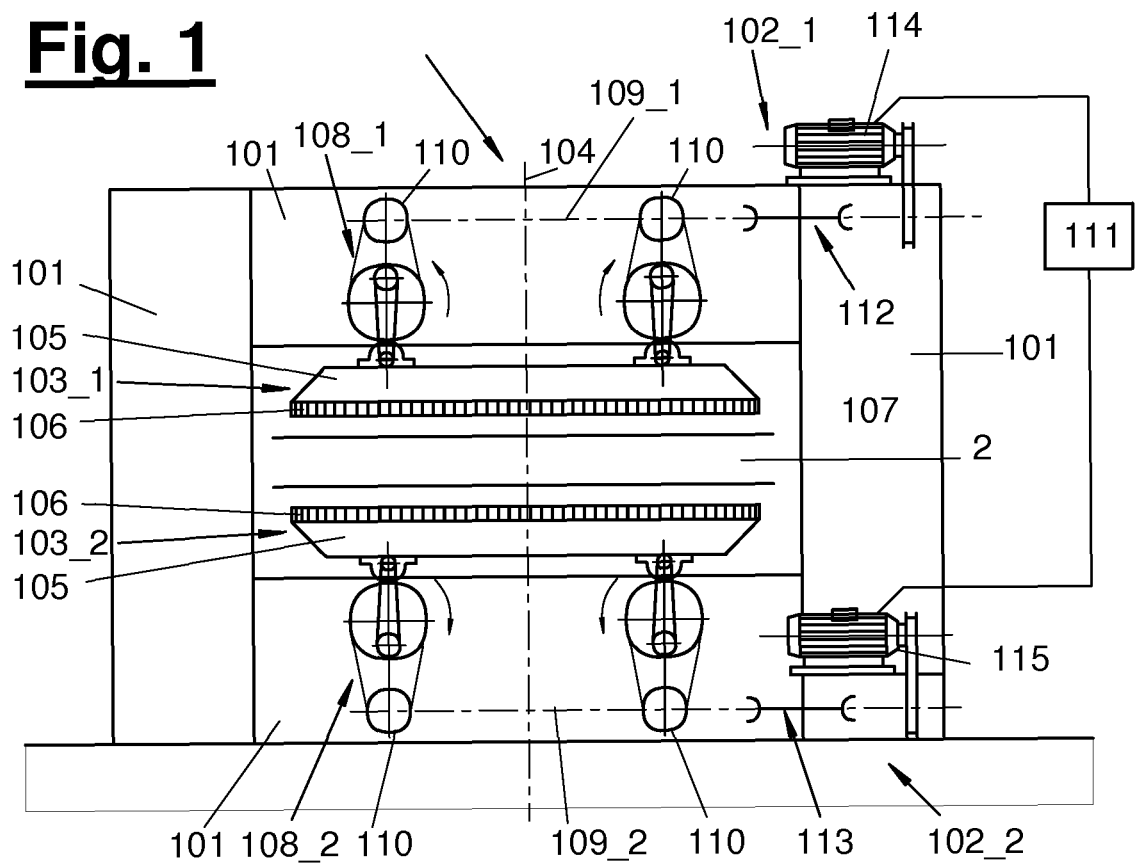
FIG. 1 is a schematic view showing a formed-fabric-strengthening device, which is configured according to one embodiment of the present invention.

Referring to the drawings, FIGS. 1 through 5 and 11 show different possible exemplary embodiments of a formed-fabric-strengthening device 100. However, these embodiments are not limiting. It should be noted that identical or similar objects are designated below by the same reference numbers.

FIG. 1 shows the embodiment of a formed-fabric-strengthening device 100 according to a first embodiment of the present invention. The formed-fabric-strengthening device 100 has a framework 101 in the form of a frame. The formed-fabric-strengthening device 100 comprises an upper needling device 103_1, which is arranged on the upper side of the frame 101, and a lower needling device 103_2, which is arranged on the lower side of the frame 101. Both needling devices 103_1, 103_2 are arranged along the same vertical axis. Each of them has at least one board 105 with needles 106, by means of which board the strengthening of the formed fabric is carried out. The needle boards 105 of the needling devices 103_1, 103_2 are directed with their respective sides fitted with needles 106 parallel to the formed fabric 2 and to a formed fabric guide 107 of the formed-fabric-strengthening device 100.

Figure 2:
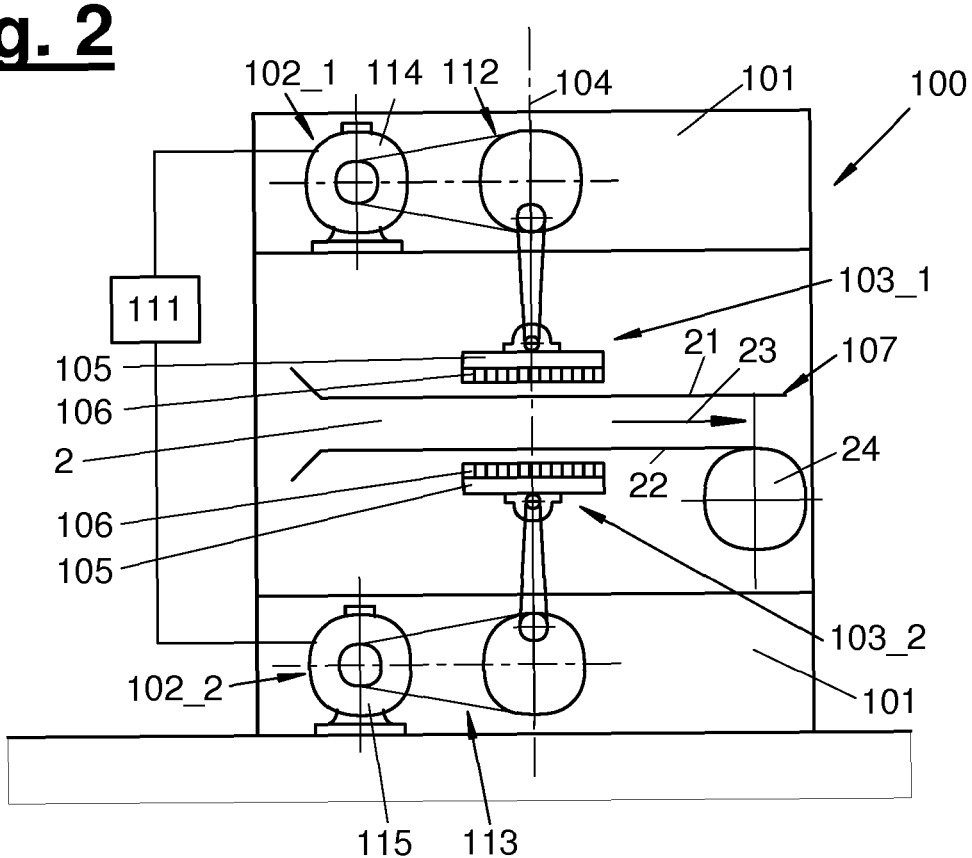
FIG. 2 is a schematic more detailed view of the needled web of the formed-fabric-strengthening device according to one embodiment of the present invention.
Figure 3:
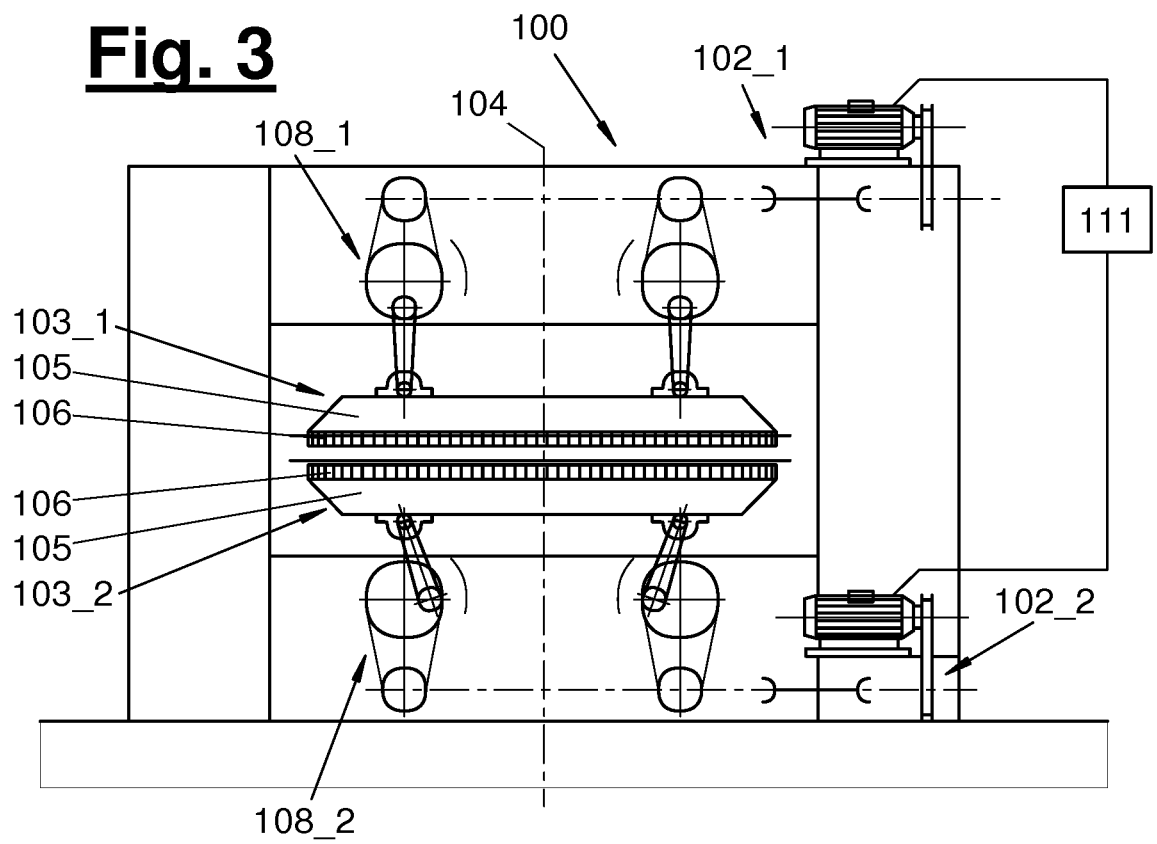
FIG. 3 is a schematic view showing a formed-fabric-strengthening device, which is configured according to one embodiment of the present invention.

FIG. 2 shows a more detailed view of the formed fabric guide 107 of the formed-fabric-strengthening device 100 according to one embodiment of the present invention. The formed fabric guide 107 is configured in the embodiment as a guide path for the preferably web-like formed fabric 2. It comprises two stationary plates 21 and 22, between which the formed fabric 2 is moved by means of a conveying device 24. The formed fabric web 2 runs through the frame 101 and between the needling devices 103_1, 103_2 in a predefined direction, which is indicated by the arrow 23 in FIG. 2. The needling devices 103_1, 103_2 are moved up and down during the run of the formed fabric web 2 such that the needles 106 of the boards 105 of the needling devices 103_1, 103_2, which needles are oriented towards the formed fabric guide 107, are inserted into the formed fabric and perform an interlacing of the fibers in the formed fabric 2. The needles 106 of the upper needling device 103_1 pierce the upper plate 21 and the needles 106 of the lower needling device 103_2 pierce the lower plate 22 of the needled web 107. The situation in which the needles 106 of the upper needling device 103_1 pierce the plate 231 is shown in FIG. 3.

The formed fabric or the formed fabric web 2 consists of a preferably nonwoven fiber composite, especially a nonwoven with a preferably tangled arrangement of fibers or of a strand with essentially longitudinally oriented fibers. The formed fabric or the formed fabric web 2 may have a single-layer or multilayer configuration, especially a configuration as a laid nonwoven.

According to the configuration according to FIG. 2, the conveying device 24 comprises a drive roller, which is driven rotatingly during the operation of the formed-fabric-strengthening device and thus allows the formed fabric web 2 to run in the predefined direction 23. The conveying device 24 may have a plurality of drive rollers or other conveying means, which are preferably arranged in front of and possibly behind the needling devices 103_1, 103_2 in the direction of run 23. The conveying device 24 preferably operates continuously and maintains the formed fabric web 2 under tension.

The formed fabric guide 107 shown in FIG. 2 may be used in any formed-fabric-strengthening device that is used according to the present invention, especially in each of the formed-fabric-strengthening devices 100 being described here.

According to the embodiment according to FIG. 1, the formed-fabric-strengthening device further has two drive devices 102_1 and 102_2: An upper drive device 102_1 and a lower drive device 102_2. The upper drive device 102_1 is arranged on the upper side of the frame 101 and drives the upper needling device 103_1. The lower drive device 102_2 is arranged on the lower side of the frame 101 and drives the lower needling device 103_2. The drive devices 102_1 and 102_2 may be, for example, motors 114, 115, especially electric motors or other drives and drive trains 112, 113. Each needling device 103_1, 103_2 is thus driven by a drive device 102_1 and 102_2. Each drive device 102_1 and 102_2 has a drive 114, 115 of its own and a drive train 112, 113 of its own.

The upward and downward motions of each board 105 of each needling device 103_1, 103_2 takes place according to the embodiment shown in FIG. 1 by means of a forward and reverse mechanism 108_1, 108_2. An upper forward and reverse mechanism 108_1 is used for the upper needling device 103_1 and a lower forward and reverse mechanism 108_2 is used for the lower needling device 103_2. Each mechanism 108_1, 108_2 comprises according to this embodiment two connecting rod systems, which are connected to a common shaft 109_1, 109_2 by angle reversing devices 110. The two connecting rod systems of a forward and reverse mechanism 108_1, 108_2 rotate in opposite directions. As a result, forces of inertia can be compensated. The common shafts 109_1, 109_2 and the angle reversing devices 110 are each components of a drive train 112, 113. Further components, e.g., a belt drive for the connection to the drive 114, 115, etc., may belong to this.

According to this embodiment, each of the common shafts 109_1, 109_2, which drives the forward and reverse mechanism of the corresponding needling device 103_1, 103_2, is connected to the corresponding drive 114, 115 and is driven by this. I.e., the common upper shaft 109_1 of the upper drive train 112 drives the strengthening device of the upper needling device 103_1, is connected to the upper drive 114 and is driven by this. The common lower shaft 109_2 of the lower drive train 112 drives the forward and reverse mechanism of the lower needling device 103_2, is connected to the lower drive 115 and is driven by this. The common upper shaft and the common lower shaft, 109_1, 109_2, respectively, are mechanically independent here from one another. The drive of the needling devices 103_1, 103_2 by the drive devices 102_1, 102_2 is configured as a crank gear according to this embodiment.

FIG. 1 shows the needling devices 103_1, 103_2 in a position in which it is separated from the formed fabric 2. The insertions by the needles 106 of the two needling devices 103_1, 103_2 from the upper and lower sides of the formed fabric guide 107 take place simultaneously according to the embodiment shown in FIG. 1. This corresponds to the operation of the simultaneous insertion. Starting from the position of the needling devices 103_1, 103_2 shown in FIG. 1, the boards 105 of these needling devices with needles 106 are in the position of minimum depth of penetration and maximum distance after a rotation by 180° of each connecting rod system or forward and reverse mechanism 108_1, 108_2.

As was already explained, the needles are inserted into the formed fabric 2 at high frequencies. Due to the insertion of the needles 106 into the formed fabric 2, oscillation excitation is generated, which may lead to damage to the formed-fabric-strengthening device 100. To avert this, the formed-fabric-strengthening device according to this embodiment has a control device 111, which controls the operation of the drive devices 102_1, 102_2 such that oscillations that were detected on the frame 101 of the formed-fabric-strengthening device are taken into consideration. The control device 111 is connected for this to each drive 1154, 115 of the drive devices 102_1, 102_2 in the embodiments shown in FIGS. 1 through 5. The control device 111 analyzes the data on the oscillations detected on the frame 101 and controls the operation of the drive devices 102_1, 102_2 such that a phase shift between them is changed such that an excitation frequency occurred during the operation of the formed-fabric-strengthening device 100 does not coincide with the resonance frequency or natural frequency of the frame 101.

FIG. 3 shows another formed-fabric-strengthening device 100 configured according to one embodiment of the present invention. The configurations of the formed-fabric-strengthening devices according to FIGS. 1 and 3 are essentially identical. This is illustrated, among other things, on the basis of the identical reference numbers used in the two figures. The difference is that the formed-fabric-strengthening device according to FIG. 3 is not operated with simultaneous insertion. In FIG. 3, the drive devices 102_1, 102_2 drive the needling devices 103_1, 103_2 such that the needles of the two needling devices 103_1, 103_2 are inserted alternatingly (e.g., with a 180° phase shift), but at the same frequency. The at least one needle board 105 of the upper needling device 103_1 is just being inserted into the fibrous web 2 in FIG. 3, while the at least one needle board 105 of the lower needling device 103_2 is not in contact with the formed fabric. This is a preferred mode of operation because no collision of needles 106 takes place now in the same position. In addition, this is the mode of operation in which the most problems related to resonances occur.

Another variant, in which the sequence of insertions of the lower needling device 103_2 is half the sequence of insertions of the upper needling device 103_1, is also possible in FIG. 3. The position of the needling devices 103_1, 103_2 shown in FIG. 3 is thus obtained after half a revolution of the upper connecting rod system or forward and reverse mechanism 108_1 and after no revolution of the lower connecting rod system or forward and reverse mechanism 108_2. The needles 106 of the at least one board 105 of the upper needling device 103_1 are in the position of maximum depth of penetration there. The needles 106 of the at least one board 105 of the lower needling device 103_2 are in an intermediate position.

Figure 4:
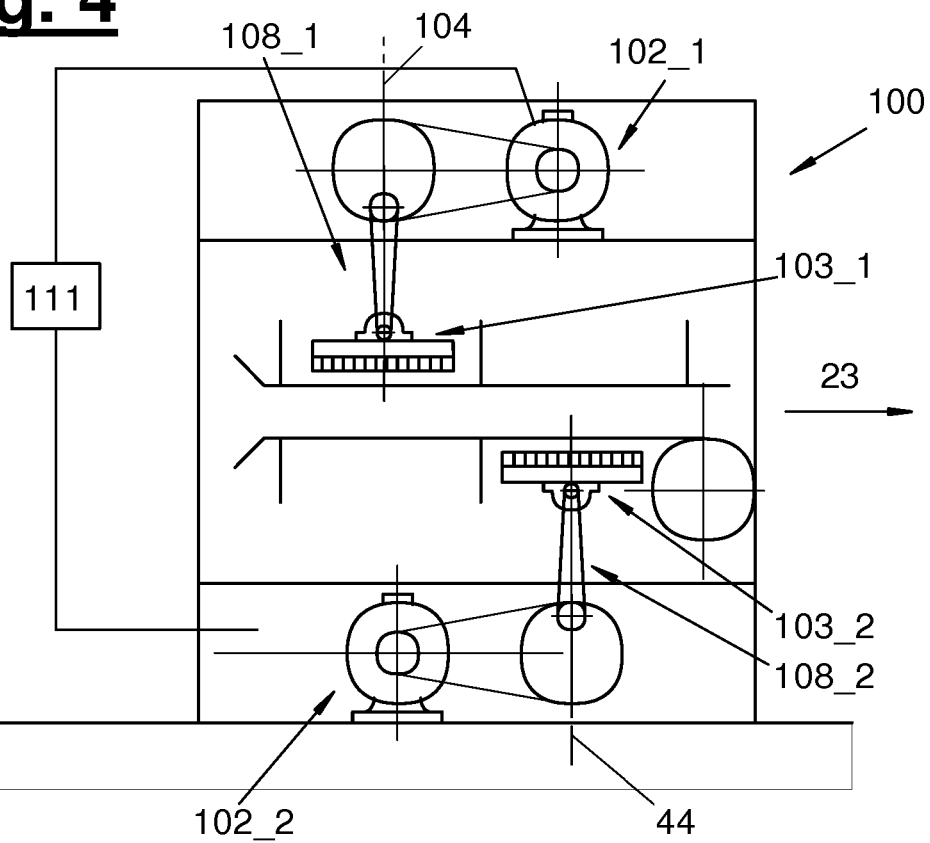
FIG. 4 is a schematic view showing a formed-fabric-strengthening device, which is configured according to one embodiment of the present invention.

FIG. 4 shows a formed-fabric-strengthening device according to another embodiment of the present invention. It differs from the formed-fabric-strengthening device according to the embodiments explained above in that the needling devices 103_1, 103_2 are not arranged on the same vertical axis 104 as in FIGS. 1 and 3, but along two vertical axes 104 and 44. The vertical axes 104, 44 are offset in relation to one another along the direction of displacement 23 of the formed fabric 2. The formed-fabric-strengthening device according to FIG. 4 may otherwise have exactly the same configuration as the formed-fabric-strengthening device according to FIG. 1 or as the formed-fabric-strengthening device according to FIG. 3. To avoid repetitions, reference will therefore be made to the corresponding statements made above.

Figure 5:
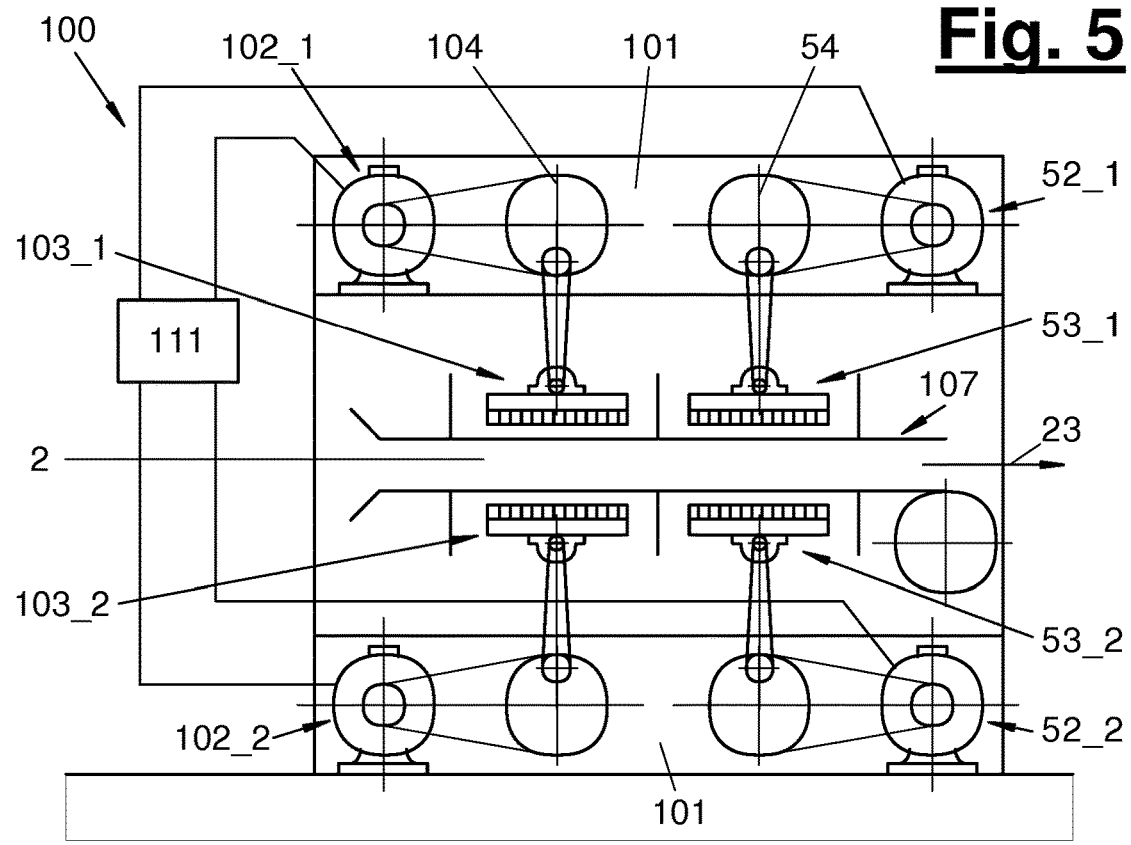
FIG. 5 is a schematic view showing a formed-fabric-strengthening device, which is configured according to one embodiment of the present invention.

FIG. 5 shows another formed-fabric-strengthening device 100 according to one embodiment of the present invention. The formed-fabric-strengthening device according to FIG. 5 has four needling devices 103_1, 103_2, 53_1, 53_2: Two upper needling devices 103_1, 53_1 and two lower needling devices 103_2, 53_2. Further, the formed-fabric-strengthening device according to FIG. 5 has four drive devices 102_1, 102_2, 51_1, 51_2: Two upper drive devices 102_1, 51_1 and two lower drive devices 102_2, 52_2. Each of the needling devices 103_1, 103_2, 53_1, 53_2 is connected to a drive device 102_1, 102_2, 51_1, 51_2 and vice versa. I.e., each needling device 103_1, 103_2, 53_1, 53_2 is driven by a drive device 102_1, 102_2, 51_1, 51_2 set for this needling device only. According to the embodiment shown in FIG. 5, the upper and lower needling devices 103_1, 103_2, 53_1, 53_2 are arranged in pairs. The needling devices 103_1, 103_2 are arranged on the same vertical axis 104, and the needling devices 53_1, 53_2 are arranged on the same vertical axis 54. The vertical axis 54 is offset into the direction of displacement 23 of the formed fabric 2 in relation to the vertical axis 104.

The control device 111 is connected (electrically) to each drive 114, 115 of the drive devices 102_1, 102_2, 51_1, 51_2 according to the embodiment shown in FIG. 5 and it controls the operation of each of the drive devices 102_1, 102_2, 51_1, 51_2. The formed-fabric-strengthening devices according to FIGS. 1 and 5 differ only in the number of needling devices and of the drive devices. The configuration of the devices and of other components belonging to them may be the same or at least essentially similar in both figures. It should be noted that the needling devices 103_1, 103_2, 53_1, 53_2 of the embodiment according to FIG. 5 and of the other exemplary embodiments do not necessarily have to operate in simultaneous insertion. Two needling devices 103_1, 103_2, 53_1, 53_2 each may be operated with different phase shifts.

Figure 11:
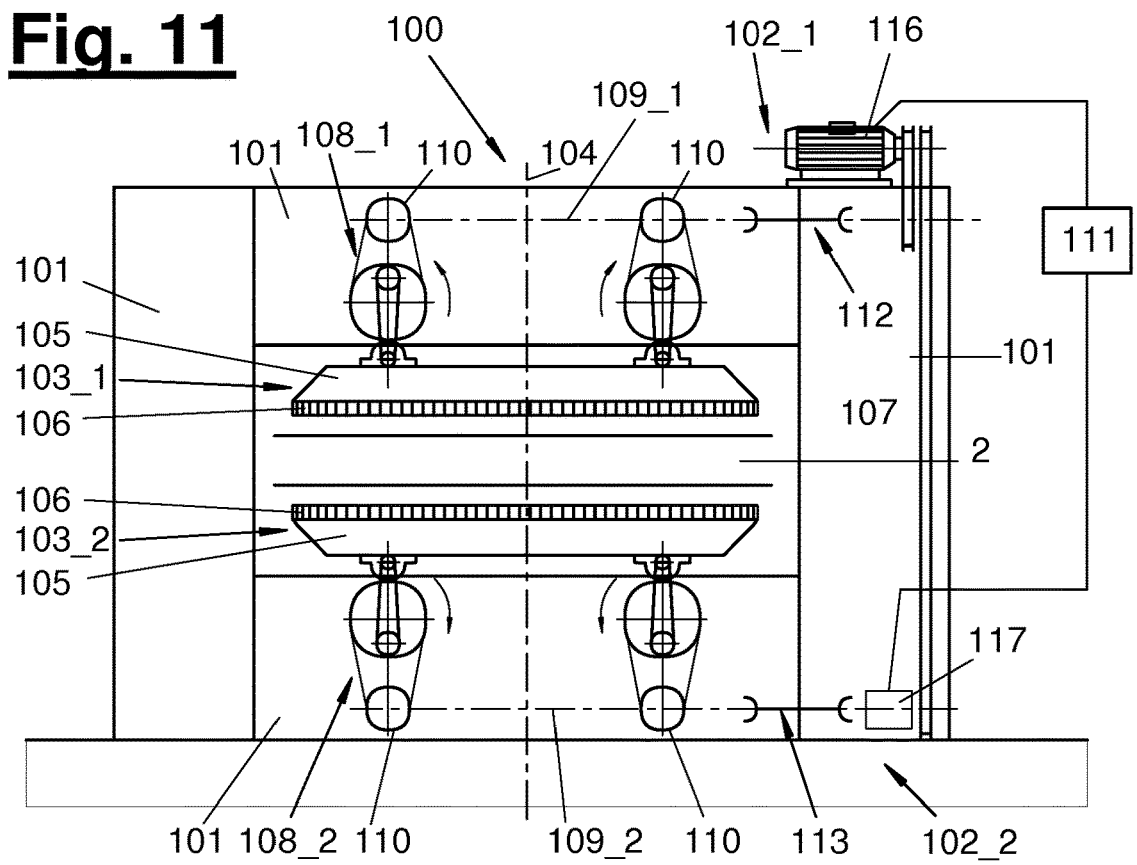
FIG. 11 is a schematic view showing a formed-fabric-strengthening device, which is configured according to another embodiment of the present invention.

FIG. 11 shows another embodiment of the formed-fabric-strengthening device 100, which is based on the variant according to FIG. 1, but which may also be used in the constructions according to the other exemplary embodiments shown in FIGS. 2 through 5. The upper drive device 102_1 and the lower drive device 102_2 have a common drive 116 in the variant according to FIG. 11 and have a drive train 112, 113 each connected thereto. The common drive motor 116 drives both drive trains 112, 113 together. A setting device 117, which is connected to the control device 111 and with which a phase shift or phase detuning can be set between the upper and lower drive devices 102_1, 102_2 when needed, is arranged in the area of at least one drive train. The setting device 117 is located, for example, in the area of the lower drive train 113. As an alternative, it may be arranged in the area of the upper drive train 112 or in the area of both drive trains 112, 113.

The setting device 117 may have various configurations and may be arranged in different ways. In FIG. 11, it is configured, for example, as a shaft coupling controllable during the operation and is arranged at the lower common shaft 109_2. As an alternative, the setting device 117 may be configured as a transmission, e.g., shift transmission, which can be adjusted or shifted during the operation. The setting device 117 may be arranged in another variant at the interface between the common drive 116 and the two drive trains 112, 113 or in another suitable location.

A common feature between all formed-fabric-strengthening devices according to the different embodiments of the present invention is represented by the control device 111, which controls the operation of the drive devices (e.g., 102_1, 102_2, 51_1, 51_2) of a formed-fabric-strengthening device 100. The control of the operation of the at least two drive devices may be carried out in the above-described manner by controlling said own drives 114, 115 or at least one own drive train 112, 113 by the setting device 117.

The control device is configured here such that it takes into consideration oscillations or oscillation data, which occur on the frame (e.g., 101) of a formed-fabric-strengthening device 100, during the operation of the drive devices. In addition to the operation of the drive devices, the control device 111 thus also has the function of protecting the formed-fabric-strengthening device 100 from excessively high oscillations and hence also from excessively high oscillation excitations.

Since each of the drive devices (e.g., 102_1, 102_2, 51_1, 51_2) operates a needling device (e.g., 103_1, 103_2, 53_1, 53_2) each, the control device 111 also controls the operation of every individual needling device (e.g., 103_1, 103_2, 53_1, 53_2) of the formed-fabric-strengthening device. As a result, the control device 111 can respond to the individual excitations, which occur due to the insertion of the needles of the needling devices, during the operation of the drive devices and of the needling devices. The operation of the drive devices and hence also of the needling devices is controlled according to some embodiments of the present invention by, e.g., the adaptation of phase shifts (of the cycle) between the individual drive devices. The adaptation of the phase shift is carried out with the use of oscillation data, which are detected directly, e.g., on the frame (e.g., 101) of the formed-fabric-strengthening device during the production operation.

According to some embodiments of the present invention, the control device 111 changes a phase shift between two or more drive devices such that an excitation frequency generated by the driving of the needling devices and the resonance frequency of the frame do not coincide. According to some embodiments of the present invention, the control device 111 changes the phase shift between two or more drive devices when the data on the oscillations detected on the frame indicate that the oscillation excitation generated may lead to damage to the formed-fabric-strengthening device. This would happen, for example, when it becomes apparent from the data on the detected oscillations in a machine setting that the excitation frequency and the resonance frequency of the frame are coming excessively close to each other.

The control device 111 is configured according to one embodiment to determine the phase shift to be performed independently or automatically. According to another embodiment, the control device 111 is configured to receive data on the phase shift to be performed. The phase shift is determined in the latter embodiment by another device and is made available to the control device 111. The data may also be inputted manually in the latter embodiment. This can be performed on the control device 111 directly or indirectly via a corresponding input device (via corresponding input devices), which then transmits (transmit) the input (data) of the control device 111.

The excitation that was generated by the corresponding needling devices is influenced by the phase shift of two drive devices. The two drive devices can drive needling devices, which are arranged on two opposite sides of the frame (e.g., 101) of a formed-fabric-strengthening device; e.g., needling devices 103_1 and 103_2 and/or needling devices 53_1, 53_2.

The phase shift between two needling devices and correspondingly also between two drive devices is usually preset. See, e.g., the above explanations given for FIG. 1, in which the standard value is 180°, and the above explanations for FIG. 3 and the drive used there for the needling devices 103_1 and 103_2. By changing the phase shift from the preset value (e.g., 180°), the critical excitation generated by the needling devices (e.g., fourth-order and fifth-order excitation) can be varied nearly as desired, and the critical speed range can be shifted.

When needed and in response to the excitations that occur due to the insertion of the needles 106 on the formed fabric 2, the control device 111 can control the drive devices in a different way in addition to the phase shift or phase detuning. Suitable and different insertion or stroke frequencies of the needling devices may be provided as desired values for needling the different formed fabrics. They can be set by means of the control device 111 by an actuation of the own drive motors 114, 114 or of the common drive motor 116. These insertion or stroke frequencies can likewise be adjusted and changed when needed relative to the formed-fabric-specific desired value. This may happen, e.g., if the phase shift or phase detuning is not sufficient as a sole control action or is limited for process engineering reasons, e.g., because of the quality of needling, etc.

Figure 6A:
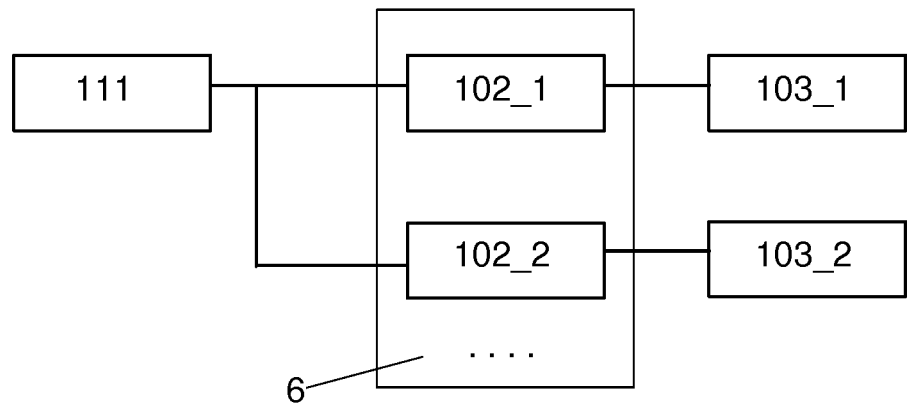
FIG. 6*a* is a schematic view showing a control device according to one embodiment of the present invention, which controls the operation of drive devices of a formed-fabric-strengthening device.
Figure 6B:
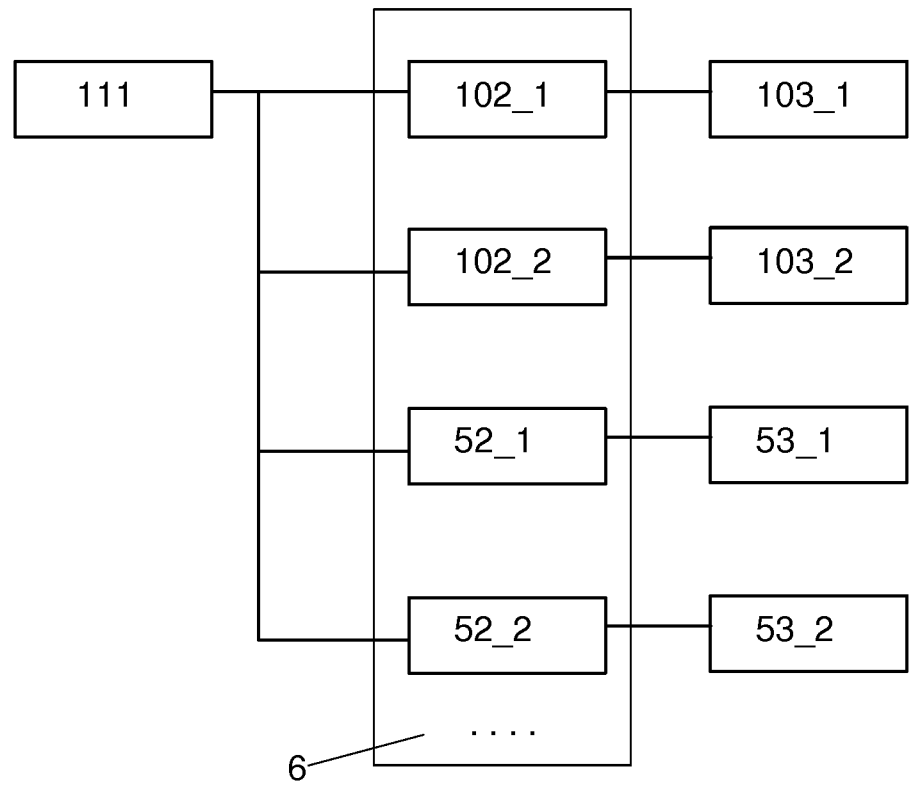
FIG. 6*b* is a schematic view showing a control device according to one embodiment of the present invention, which controls the operation of drive devices of a formed-fabric-strengthening device.
Figure 7A:
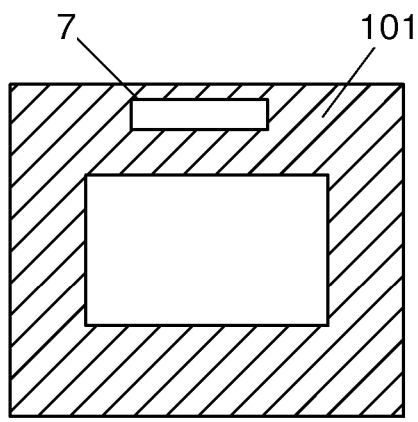
FIG. 7*a* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7B:
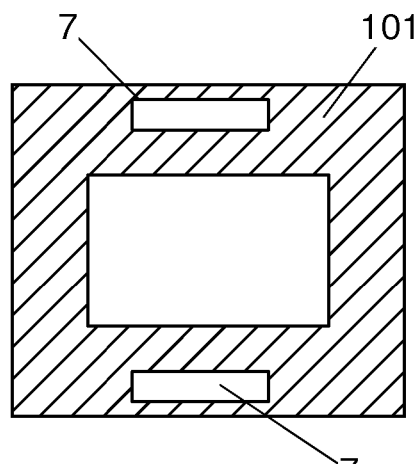
FIG. 7*b* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7C:
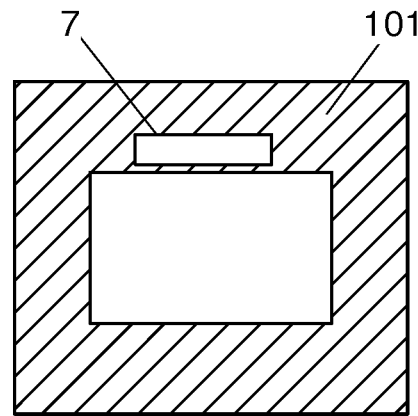
FIG. 7*c* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7D:
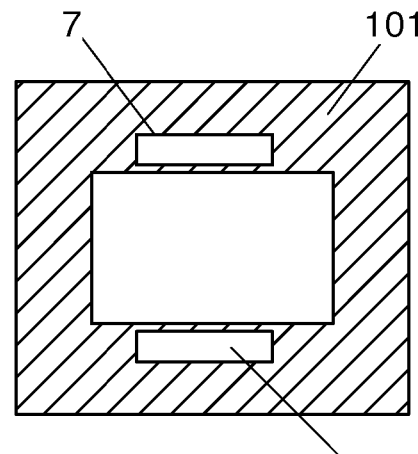
FIG. 7*d* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7E:
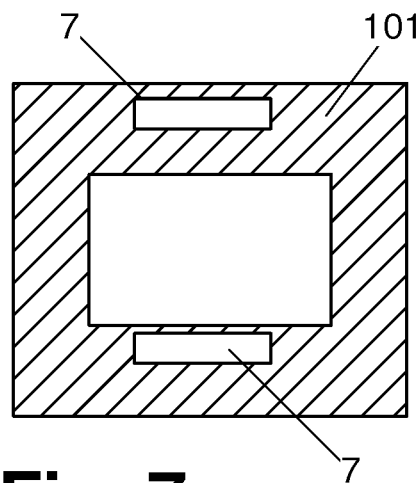
FIG. 7*e* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7F:
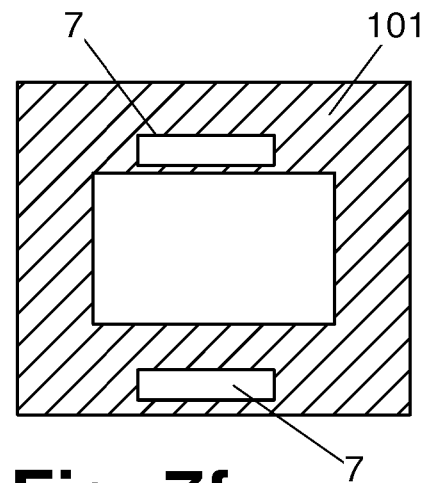
FIG. 7*f* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7G:
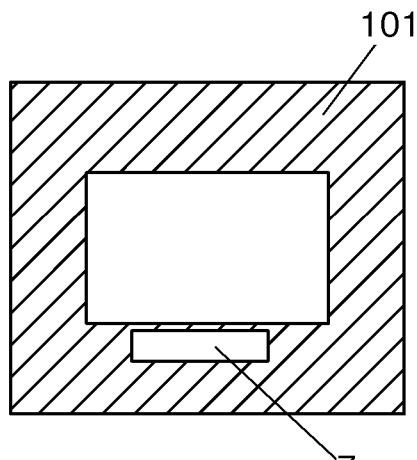
FIG. 7*g* is a schematic view showing a control device according to one embodiment of the present invention, which controls the operation of drive devices of a formed-fabric-strengthening device; at least one oscillation detection device of a formed-fabric-strengthening device according to one embodiment of the present invention.
Figure 7H:
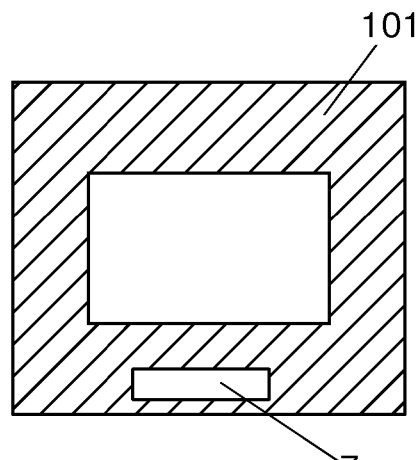
FIG. 7*h* is a schematic view showing a control device according to one embodiment of the present invention, which controls the operation of drive devices of a formed-fabric-strengthening device; at least one oscillation detection device of a formed-fabric-strengthening device according to one embodiment of the present invention.

FIGS. 6a and 6b show as an example the control device 111 according to some embodiments of the present invention, which control device controls the operation of drive devices 102_1, 102_2 of a formed-fabric-strengthening device 100. The control device 111 controls the operation as was described above. It is connected for this to a set 6 of drive devices of a formed-fabric-strengthening device. According to one embodiment, the connections are electrical connections, as a result of which dynamic, flexible and specific changes can be made in the phase shift and as a result of which the changing of a given (e.g., preset) phase shift can be carried out in an improved and reliable manner.

The set 6 of drive devices comprises at least two drive units. These may be, for example, the above-described drive devices 102_1, 102_2 (FIG. 6a) or the above-described drive devices 102_1, 102_2, 51_1, 51_2 (FIG. 6b). However, the present invention is not limited to these.

According to one embodiment of the present invention, the control device 111 may be configured to send a warning signal when the data on the oscillations detected on the frame indicate that the oscillation excitation generated may lead to damage to the formed-fabric-strengthening device. This risk would be present, e.g., as is shown above, when it becomes apparent from an analysis of the data on the detected oscillations that the excitation frequency and the resonance frequency of the frame are coming excessively close to one another. It is signaled hereby to the operators or to the person skilled in the art operating the formed-fabric-strengthening device that critical oscillations have occurred due to the operation of the formed-fabric-strengthening device. The operators or the person skilled in the art can then intervene as an alternative or in addition to the above-described control by the control device 111 and initiate corresponding steps protecting the formed-fabric-strengthening device. Phase shift changes performed by the control device 111 may be checked if necessary.

To detect oscillations on the frame 101 of a formed-fabric-strengthening device 100, i.e., to obtain oscillation data, the formed-fabric-strengthening device has, as was described above, at least one oscillation detection device 7. This is shown, for example, in FIGS. 7a through 7h, and these examples are not limiting examples. The oscillation detection device 7 is arranged according to the embodiments shown in FIGS. 7a through 7h on the frame 101 of the formed-fabric-strengthening device and is configured to detect oscillations on the frame 101, e.g., directly.

There are various possibilities for arranging an oscillation detection device 7 on the frame 101 of the formed-fabric-strengthening device 100. Thus, an oscillation detection device 7 may be arranged on the upper and/or lower side of the frame 101. It is to be expected in these positions that the oscillation detection device 7 will detect the oscillations generated by the needling devices best and most accurately. The needling device(s) is (are) arranged on the upper and/or lower side of the frame 101 and transmit the oscillations generated by the needling devices first to these two sides of the frame 101. On an (upper and lower) side of the frame 101, the oscillation detection device 7 may be arranged, for example, either in the upper part or in the lower part of the frame 101. It may be positioned, for example, centrally. The placement of the oscillation detection device 7 depends essentially on the location in the frame at which the oscillations first arrive and/or can be detected most accurately.

Figure 8:
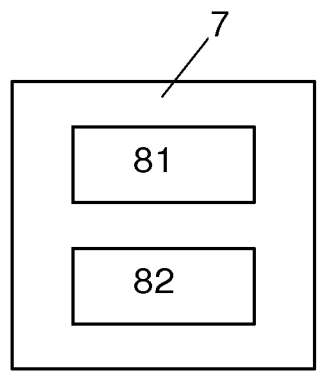
FIG. 8 is a schematic view showing an oscillation detection device according to one embodiment of the present invention.

FIG. 8 shows an oscillation detection device 7 according to one embodiment of the present invention, which can be used, as was described above, in each formed-fabric-strengthening device configured according to the present invention. According to this embodiment, the oscillation detection device 7 comprises an oscillation detection device 81, which is configured to detect the oscillations that occur during the operation of the needling devices of the formed-fabric-strengthening device. According to one embodiment, the oscillation detection device 7 or its oscillation detection unit 81 is an acceleration sensor. The oscillation detection device 7 or its oscillation detection unit 81 may also be another oscillation sensor or have such an oscillation sensor.

The oscillation detection device 7 or its oscillation detection unit 81 is preferably arranged at a location of the formed-fabric-strengthening device 100 at which most of the oscillations occur and/or at which the oscillations can best be detected (in their entirety). According to other configurations, the oscillation detection device 7 or its oscillation detection unit 81 is arranged on the frame 101 of the formed-fabric-strengthening device.

Furthermore, the oscillation detection device 7 has a communication unit 82, which transmits the data on the detected oscillations to the control device 111 of the formed-fabric-strengthening device 100. The oscillation detection device 7 can detect the oscillations (with the use of the oscillation detection unit 81) without prompting, e.g., periodically and transmit them (with the use of the communication unit 82) to the control device 111. As an alternative or in addition, the oscillation detection device 7 or its communication unit 82 may receive a prompt from the control device 111 to perform the detection of oscillations.

Figure 9:
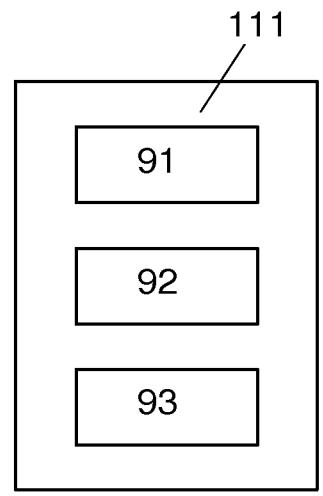
FIG. 9 is a schematic view showing an exemplary embodiment of the above-described control device 111 according to one embodiment of the present invention.

FIG. 9 shows an exemplary embodiment of the above-described control device 111 according to one embodiment of the present invention. According to this embodiment, the control device 111 has a communication unit 91, which is configured to receive data on the detected oscillations generated by the operation of the formed-fabric-strengthening device. As was already mentioned, the detection of the oscillations is carried out in some embodiments on the frame 101 of the formed-fabric-strengthening device. The control device 111 may also use the communication device 91 to send prompts to the oscillation detection device 7 in order for the oscillation detection device 7 to measure the oscillations generated by the operation of the formed-fabric-strengthening device.

According to the present embodiment, the control device 111 has a processing unit 92. According to the present embodiment, the processing unit 92 is configured to analyze the data on the detected oscillations and possibly to indicate one or more phase shifts between two or more drive devices (e.g., 102-1, 102_2, 52_1, 52_2), as was already described above.

The processing unit 92 is configured for this according to one embodiment to determine the phase shift to be performed independently or automatically. According to another embodiment, the processing unit 92 is configured to detect an input, which has data on the phase shift to be performed.

The data on the detected oscillations are displayed in the latter case. This may take place, for example, acoustically and/or visually. According to one embodiment, the detected oscillations are displayed by the control device 111 itself. According to another embodiment, the display is carried out by another device/unit configured for this; the control device 111 can provide in this case corresponding data on the detected oscillations of the device configured for the display (e.g., by means of a data transmission by the communication unit 91). In response to the display of the data on the detected oscillations, the control device 111 can receive a corresponding input on the phase shift to be performed. The input may be carried out with the use of the control device 111 itself or with the use of another device configured for the input. The input may also be performed by a human operator manually. An automatic input may, furthermore, be changed manually by a human operator if necessary.

If it was determined that one or more phase shifts are to be changed, the control device 111 transmits corresponding data to the drive devices of the formed-fabric-strengthening device. These data may comprise instructions to change a phase by a defined amount. Further, the data on the changes in the phase shift or phase shifts to be performed and optionally in the stroke frequency can be transmitted by means of the communication unit 91 to the corresponding drive devices. In addition, the control device 111 according to this embodiment has a warning display unit 93, which is configured to send a warning signal if the control device 111 or its processing unit 92 determined by an analysis of the data on the detected oscillations that the oscillations could lead to damage to the formed-fabric-strengthening device. This warning signal may have various configurations. It may be, for example, an acoustic signal, a visual signal and/or a data signal, which is transmitted, e.g., to a central control or to another unit.

Figure 10:
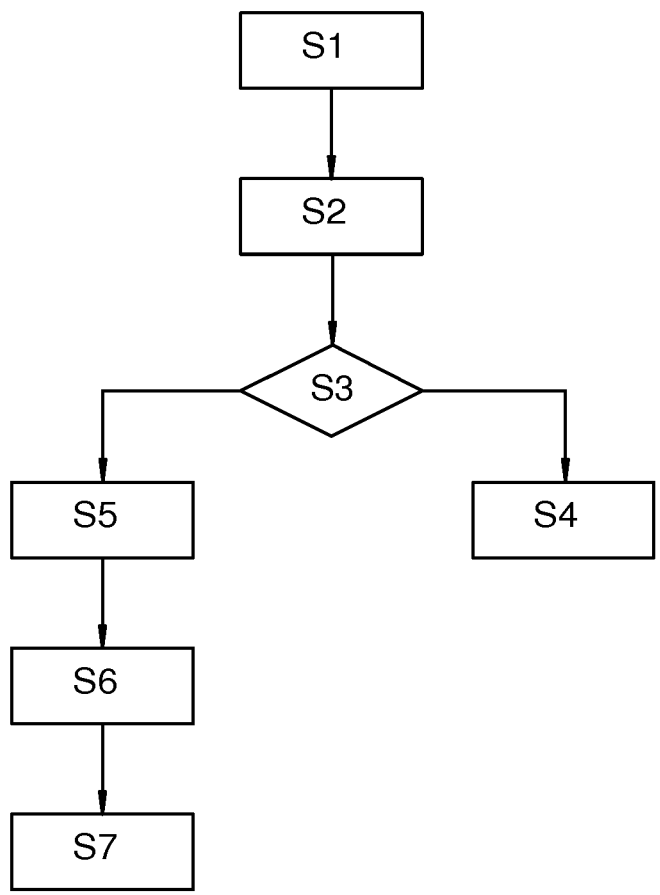
FIG. 10 shows steps of a process for operating at least two drive devices of a formed-fabric-strengthening device according to one embodiment of the present invention.

FIG. 10 shows the steps of a process for operating at least two drive devices of a formed-fabric-strengthening device according to one embodiment of the present invention. The steps of the process are carried out especially as explained above.

The oscillations, which occur during the operation of the formed-fabric-strengthening device, are detected in step S1. The oscillations are detected according to some embodiments on the frame (e.g., 101) of the formed-fabric-strengthening device. This may take place, for example, by means of the at least one above-described oscillation detection device 7. The detected data are transmitted to the control device 111 in step S2. The control device 111 checks in step S3, as was described above, whether the oscillations can lead to damage to the formed-fabric-strengthening device, especially whether the oscillation excitations generated by the drive of the needling devices are critical (see the above explanations in this connection). If the checking in step S3 shows that the oscillations cannot lead to damage to the formed-fabric-strengthening device, the operation of the actuating devices and hence also the actuation of the needling devices is continued without any change. Otherwise, the control device 111 changes in step S5 the existing or current phase shift between at least two drive devices and hence also between the corresponding, at least two needling devices as was described above.

As an alternative or in addition, the control device 111 may also output or display in step S5 a warning signal as was described above. In step S6, the control device 111 transmits the data or instructions for the phase shift changes to be performed to the corresponding drive devices. The drive devices perform the phase shift changes requested or implement these and drive the needling devices according to the new or changed phase shifts.

In the above-mentioned exemplary embodiments, the oscillation detection device 7 is arranged in the production or process operation at the formed-fabric-strengthening device 100 and is in operation. It detects the oscillations occurring during the production operation due to the needle insertion forces. It may also be used during the set-up of the formed-fabric-strengthening device 100 or at the time of the changeover to another formed fabric 2. The occurring oscillations are detected directly and are analyzed and used for control purposes.

In another embodiment, which is not shown, the oscillations can be detected in the above-described manner indirectly by means of a sensor-based detection of the stroke frequency and of a polling of an assignment, especially of a characteristic diagram, to determine the corresponding oscillation excitation. The oscillation detection device 7 performs the detection of the stroke frequency and a polling of the assignment or of the characteristic diagram in this variant. It may be configured for this as a separate device and may also have a sensor for detecting the stroke frequency and a memory for the assignment or the characteristic diagram. The oscillation detection device 7 may be implemented, as an alternative, in another component of the formed-fabric-strengthening device 100, especially in the control device 111 thereof.

The sensor-based detection of the stroke frequency may be carried out in the above-mentioned manner by a corresponding sensor indirectly for the direct detection or by an impulse transmitter, which is usually present anyway, at at least one drive 114, 115, 116 and reported to the control device 111 or to a separate oscillation detection device 7. The assignment or the characteristic diagram may be generated, e.g., in the form of a technology database, in advance by the manufacturer or by the operator of the formed-fabric-strengthening device 100. The drive devices are operated now at different speeds or with different stroke frequencies, and the respective corresponding oscillations generated by the needle forces are detected in a suitable manner, e.g., by one or more of the above-mentioned oscillation sensors, especially acceleration sensors, which are used temporarily if necessary.

The excitation frequency induced by the needle forces or the frequency spectrum of that frequency is detected in the above-mentioned exemplary embodiment and compared with one or more resonance frequencies of the formed-fabric-strengthening device 100. As an alternative or in addition, the amplitudes of the oscillations excited by the needle forces are detected and compared with an amplitude limit value, which is representative of one or more of the resonance frequencies. The limit value is in the range and at or preferably close to said resonance frequency or resonance frequencies, and it defines a threshold that should not be exceeded during the production and process operation.

The above data on the oscillations generated by the driving of the needling device can indicate in the above-mentioned manner the excitation frequency and possibly, even though not necessarily, a resonance frequency of the formed-fabric-strengthening device 100 as well as alternatively or additionally the oscillation amplitude occurring due to the driving of the needling device and said amplitude limit value. This indication may take place by means of a message to the control device 111 and/or by an optical or other display at an operator.

The aforementioned detection of an oscillation amplitude and of a limit value may likewise be carried out directly or indirectly. Said assignment or the characteristic diagram may contain, in addition or as an alternative to the excited oscillation frequencies, the amplitudes of these oscillations and as a representative for the resonance, the amplitude limit value. These variants of the oscillation detection may be combined with all the aforementioned exemplary embodiments according to FIGS. 1 through 5 and 11 for the formed-fabric-strengthening device 100.

In another variant of these exemplary embodiments according to FIGS. 1 through 5 and 11, a needle board 105 may have a multipart and segmented configuration. The segmentation may be present over the working width at right angles to the direction of run 23 and/or in the direction of run 23.

In the exemplary embodiment according to FIG. 5, the upper needling devices 53_1, 103_1 are moved synchronously and in phase. A phase shift or phase detuning is preferably set between the upper and lower needling devices. As an alternative or in addition, a phase shift or phase detuning may be carried out in the respective needling devices located on the same side of the formed fabric web 2. This phase detuning may affect, e.g., the phased ratio of the upper needling devices 53_1, 103_1 among each other and/or the phase ratio of the lower needling devices 53_3, 103_2 among each other. A phase shift or phase detuning of the respective needling devices located on the same side of the formed fabric may also affect the aforementioned segments of a divided needle bar 105 if these are connected each individually or in groups to a drive device. However, the phase shift or phase detuning described in connection with the exemplary embodiments described is preferably between upper and lower needling devices.

As was described above, the present invention pertains to a formed-fabric-strengthening device, which is configured to strengthen formed fabric and which has: At least two drive devices, each of which is configured to drive at least one needling device of the formed-fabric-strengthening device, wherein each needling device is configured to strengthen formed fabric and is driven by one of the at least two drive devices; at least one oscillation detection device, which is configured to detect oscillation data, wherein the oscillations comprise oscillations that occur due to the operation of the needling devices; and a control device, which is configured to receive the oscillation data detected by the oscillation detection device and to control the operation of the at least two drive devices in response to the reception of the oscillation data.

The present invention pertains, in addition, to the control device, which is configured to operate at least two drive devices of the formed-fabric-strengthening device, and to a process for operating the at least two drive devices of the formed-fabric-strengthening device.

Even though the present invention is explained above with reference to the embodiments according to the attached drawings, it is seen that the present invention is not limited to these, but it may be modified within the scope of the inventive idea disclosed in dependent claims. It is obvious that there may be even more embodiments that represent the principle of the present invention and are equivalent, and that different modifications can thus be implemented without deviating from the scope of the present invention.

While specific embodiments of the invention have been shown and described in detail to illustrate the application of the principles of the invention, it will be understood that the invention may be embodied otherwise without departing from such principles.

The invention claimed is:

1. A formed-fabric-strengthening device, which is configured to strengthen formed fabric, the formed-fabric-strengthening device comprising:
   at least two needling devices;
   at least two drive devices, each of which is configured to drive at least one of the needling devices, wherein each needling device is configured to strengthen the formed fabric and is driven by one of the at least two drive devices;

at least one oscillation detection device configured to detect oscillation data, wherein the oscillation data comprises oscillations that occur due to the operation of the needling devices; and a control device configured to receive the oscillation data detected by the at least one oscillation detection device, and to control the operation of the at least two drive devices in response to the received oscillation data by transmitting control information to the drive devices, wherein:

the control information has information on a phase shift between two of the at least two drive devices, with which the two drive devices are to be operated; and the phase shift is a phase shift that was determined in response to the reception of the oscillation data.

2. A formed-fabric-strengthening device in accordance with claim 1, wherein:

the at least two drive devices each have a drive train; and the at least two drive devices each have a drive to provide at least a plurality of drives or the at least two drive devices share a common drive.

3. A formed-fabric-strengthening device in accordance with claim 2, wherein the control device is configured to control the drives of the at least two drive devices or a setting device in the area of the drive train of the at least two drive devices.

4. A formed-fabric-strengthening device in accordance with claim 1, wherein the control device is configured:

to detect an input, which has data on the phase shift; or to determine the phase shift.

5. A formed-fabric-strengthening device in accordance with claim 1, wherein the oscillation data indicate at least one of:

an excitation frequency, which occurs due to the driving of the needling devices, and a resonance frequency of the formed-fabric-strengthening device; and an oscillation amplitude, which occurs due to the driving of the needling devices, and a limit value for the oscillation amplitude, which is in the range of the resonance frequency of the formed-fabric-strengthening device.

6. A formed-fabric-strengthening device in accordance with claim 5, wherein the control device is configured to determine the phase shift such that at least one of:

the excitation frequency, which occurs due to the driving of the needling devices, and the resonance frequency of the formed-fabric-strengthening device do not coincide; and the oscillation amplitude, which occurs due to the driving of the needling devices, does not exceed the limit value in the range of the resonance frequency.

7. A formed-fabric-strengthening device in accordance with claim 5, wherein the control device is configured to determine the phase shift if the oscillation data indicate that the excitation frequency and the resonance frequency are coming close to each other or that the oscillation amplitude is coming close to the limit value.

8. A formed-fabric-strengthening device in accordance with claim 1, wherein the formed-fabric-strengthening device has a frame.

9. A formed-fabric-strengthening device in accordance with claim 1, wherein the at least one oscillation detection device detects the oscillations occurring during the driving of the needling devices and comprises an oscillation sensor comprising an acceleration sensor.

10. A formed-fabric-strengthening device in accordance with claim 1, wherein the at least one oscillation detection device has a sensor for sensing stroke frequency of the needling devices and a stored device-specific characteristic diagram, of the stroke frequencies to the oscillations occurring.

11. A formed-fabric-strengthening device in accordance with claim 8, wherein the at least one oscillation detection device is arranged on the frame.

12. A formed-fabric-strengthening device in accordance with claim 8, wherein the resonance frequency is a resonance frequency detected on the frame.

13. A formed-fabric-strengthening device in accordance with claim 12, further comprising another oscillation detection device, wherein at least two oscillation detection devices are arranged on two different sides of the formed-fabric-strengthening device.

14. A formed-fabric-strengthening device in accordance with claim 13, wherein at least one of the at least two oscillation detection devices is arranged above the needling devices and wherein at least one other of the at least two oscillation detection devices is arranged under the needling devices.

15. A formed-fabric-strengthening device in accordance with claim 13, wherein the at least one of the at least two oscillation detection devices is arranged on the upper side of the frame and the at least one other of the at least two oscillation detection devices is arranged on the lower side of the frame.

16. A formed-fabric-strengthening device in accordance with claim 8, wherein:

the needling devices comprise at least one upper needling device and at least one lower needling device, wherein the upper needling device is arranged on the upper side of the frame and the at least one lower needling device is arranged on the lower side of the frame, wherein each of the needling devices has at least one board with needles for strengthening the formed fabric; and the at least two drive devices comprise at least one upper drive device and at least one lower drive device, wherein each of the upper drive devices is configured to drive one of the upper needling devices and each of the lower drive devices is configured to drive one of the lower needling devices.

17. A formed-fabric-strengthening device in accordance with claim 1, wherein the formed-fabric-strengthening device has a conveying device for conveying the web-like formed fabric through the needling devices.

18. A formed-fabric-strengthening device in accordance with claim 1, further comprising a formed fabric guide at the needling devices.

19. A control device configured:

to receive oscillation data detected by an oscillation detection device of a formed-fabric-strengthening device, wherein the oscillation data comprises oscillations that occur due to the operation of needling devices of the formed-fabric-strengthening device;

to control the operation of at least two drive devices of the formed-fabric-strengthening device in response to the reception of the oscillation data by transmitting control information to the drive devices, wherein:

each of the drive devices is configured to drive at least one needling device of the formed-fabric-strengthening device, and each needling device is configured to strengthen the formed fabric and is driven by one of the at least two drive devices;

the control information has information on a phase shift between two of the at least two drive devices, with which the two drive devices are to be operated; and the phase shift is a phase shift that was determined in response to the reception of the oscillation data.

20. A process for controlling the operation of at least two drive devices of a formed-fabric-strengthening device, wherein the formed-fabric-strengthening device is configured to strengthen formed fabric and each of the drive devices of the formed-fabric-strengthening device drives at least one needling device of the formed-fabric-strengthening device, wherein the process comprises:

receiving oscillation data, which were detected by an oscillation detection device of the formed-fabric-strengthening device, wherein the oscillation data comprises oscillations that occur due to the operation of needling devices of the formed-fabric-strengthening device; and controlling operation of the at least two drive devices of the formed-fabric-strengthening device by transmitting control information to the drive devices in response to the reception of the oscillation data, wherein:

the control information has information on a phase shift between two of the at least two drive devices, with which the two drive devices are to be operated; and the phase shift is determined in response to the reception of the oscillation data.

* * * * *